United States Patent Office 2,920,068
Patented Jan. 5, 1960

2,920,068

PROCESS FOR TREATING PROTEIN WITH PYROCARBONIC ACID ESTERS

Hermann Bernhard, Koln-Stammheim, Ottmar Wahl, Opladen, and Hermann Genth, Krefeld-Bockum, Germany, assignors to Farbenfabriken Bayer Aktiengesellchaft, Leverkusen, Germany, a corporation of Germany No Drawing. Application July 2, 1957
Serial No. 669,471

Claims priority, application Germany July 5, 1956

3 Claims. (Cl. 260—117)

The present invention relates to a process for treating proteins; more particularly it comprises a process wherein the proteins are contacted with pyrocarbonic acid esters.

The pyrocarbonic acid esters correspond to the general formula

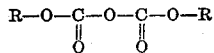

wherein the two groups R are the same or different organic radicals; such radicals are, for example, alkyl radicals such as methyl, ethyl, propyl, isopropyl, butyl isobutyl, amyl, isoamyl, or cycloalkyl radicals such as cyclohexyl, furthermore aryl or aralkyl radicals such as phenyl and benzyl, or heterocyclic radicals such as e.g. furfuryl. The pyrocarbonic acid esters to be used according to the invention are obtainable, for example, by the reaction of chloroformic acid esters with alkali metal salts of carbonic acid semi-esters.

According to the process of the invention it is possible to improve the properties of proteins such as casein, zein, soya protein and particularly of gelatin and glue. In this way the viscosity of aqueous protein solutions, for example, may be increased thus essentially raising the solidifying point of the solutions, and the isoelectric point of the proteins may be shifted to a lower pH range. It should be noted that the proteins treated according to the process of the invention also retain the new valuable properties even after drying and disintegrating and do not lose them after prolonged storage. On the other hand, the ability of the proteins of being hardened with the conventional hardening agents such as formaldehyde, is completely maintained after the treatment according to the invention.

The process of contacting the proteins with pyrocarbonic acid esters is advantageously carried out by the slow and dropwise introduction of the esters per se or in the form of dilute alcoholic or acetone solutions into the aqueous protein solutions heated to about 35–50° C., with intimate mixing. The quantities of pyrocarbonic acid esters to be employed are dependent on the kind and concentration of the protein solutions to be treated; they may readily be established for each case by preliminary experiments and are in general approximately 1.5 to 6 percent referred to the solid contents of proteins. Further details may be derived from the example given below.

It may be assumed that the process of the invention is based on the capability of pyrocarbonic acid esters to react with reactive hydrogen atoms according to the following equation

wherein X is the radical of a compound containing a reactive hydrogen.

It may be seen from the above that carbonic acid and alcohols, i.e. substances of volatile or neutral character, are formed as by-products. The process according to the invention is therefore advantageously distinguished from known processes for the treatment of proteins where acylation agents such as acid chlorides or acid anhydrides, are employed, thus yielding acids as by-products which have to be neutralised and subsequently removed in the form of their salts by dialysis.

In carrying out of the process of the invention, the diethyl ester of pyrocarbonic acid is generally preferred since the reaction products, i.e. carbonic acid and ethyl alcohol, which are formed in addition to the protein reaction products, are physiologically completely harmless.

The proteins obtained by the process of the invention may be used with advantage for a great number of purposes because of their improved properties in place of untreated proteins. They are especially suitable for the production of photographic layers and other materials.

The following example serves to illustrate the invention without, however, limiting the scope thereof.

Example

Into 1 kilogram of a 15 percent aqueous gelatin solution heated to 35–50° C., 4 millilitres of pyrocarbonic acid diethyl ester are introduced dropwise with vigorous stirring within 15 minutes whereby a slight reaction occurs at once with moderate evolution of gas. The solution is subsequently stirred for a further hour at the same temperature and then subjected to a conventional drying process.

The untreated gelatin and the gelatin treated in the foresaid manner or their aqueous solutions differ from one another inter alia as follows:

The viscosity, measured by capillary flow, of a 10 percent solution of the untreated gelatin is 14.4 seconds, of a 10 percent solution of the treated gelatin 78 seconds; the solidifying temperature of a 10 percent solution of the untreated gelatin is 20° C., of the treated gelatin 29° C.; the period of time required for a solution poured into a glass plate to solidify at room temperature amounts to 30 minutes for a 3 percent solution of the untreated gelatin, to 6 minutes for a 3 percent solution of the treated gelatin; the temperature at which a 3 percent solution solidifies is 9° C. for the untreated gelatin and 17° C. for the treated gelatin.

We claim:

1. A process for treating a protein selected from the group consisting of gelatin and glue which comprises adding a pyrocarbonic acid ester gradually with stirring to a neutral aqueous solution of the protein at a temperature between 35 and 50° C., said pyrocarbonic acid ester having the general formula

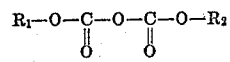

wherein $R_1$ and $R_2$ each represent a member of the group consisting of an alkyl radical containing up to 5 carbon atoms and the cyclohexyl, benzyl, phenyl and furfuryl radical.

2. Process of claim 1 wherein the pyrocarbonic acid ester is the diethyl ester of pyrocarbonic acid.

3. A process for increasing the viscosity of an aqueous gelatine solution which comprises adding pyrocarbonic acid diethyl ester gradually with stirring to a neutral solution of an aqueous gelatine solution at a temperature of 35–50° C., whereby a reaction occurs with evolution of gas, and subsequently drying the solution, whereby the solidifying temperature and time of the product are increased.

References Cited in the file of this patent

UNITED STATES PATENTS

| | | |
|---|---|---|
| 2,713,574 | Vaughan | July 19, 1955 |
| 2,713,575 | Gates et al. | July 19, 1955 |

OTHER REFERENCES

Parfent'ev et al.: Chem. Abstracts, vol. 35, p. 4351 (1941).